(12) United States Patent  
Hseush et al.

(10) Patent No.: US 8,364,723 B1  
(45) Date of Patent: Jan. 29, 2013

(54) APPARATUS AND METHOD FOR REALIZING BIG DATA INTO A BIG OBJECT AND NON-TRANSITORY TANGIBLE MACHINE-READABLE MEDIUM THEREOF

(75) Inventors: Wenwey Hseush, Taipei (TW); Shih-Chang Hsu, Taipei (TW); Yi-Cheng Huang, Taipei (TW); Michael Chih Huong Fong, Taipei (TW); Yi-Chen Hsu, Taipei (TW)

(73) Assignee: eBizprise Inc., Taipei (TW)

( * ) Notice: Subject to any disclaimer, the term of this patent is extended or adjusted under 35 U.S.C. 154(b) by 0 days.

(21) Appl. No.: 13/415,622

(22) Filed: Mar. 8, 2012

(51) Int. Cl.  
*G06F 17/00* (2006.01)

(52) U.S. Cl. .................. 707/803; 707/758; 707/792

(58) Field of Classification Search .................. 707/758, 707/792, 803, 802  
See application file for complete search history.

(56) References Cited

U.S. PATENT DOCUMENTS 8,135,716 B2 * 3/2012 Stork et al. ............ 707/740  
2012/0233522 A1 * 9/2012 Barton et al. ............ 714/758

* cited by examiner

*Primary Examiner* — Belix M Ortiz Ditren  
(74) *Attorney, Agent, or Firm* — Patterson Thuente Christensen Pedersen, P.A.

(57) ABSTRACT

An apparatus and method for realizing big data into a Big Object and a non-transitory tangible machine-readable medium are provided. The apparatus comprises an interface and a processor. The interface is configured to access big data stored in a storage device. The processor is configured to create the Big Object from the big data using memory mapped files. The processor further lays out a content of the Big Object, wherein the content comprises a meta information section, a tree section, and a data section. The processor further lays out a content of the tree section by using LIS and describes a structure of the Big Object in the meta information section.

25 Claims, 6 Drawing Sheets

APPARATUS AND METHOD FOR REALIZING BIG DATA INTO A BIG OBJECT AND NON-TRANSITORY TANGIBLE MACHINE-READABLE MEDIUM THEREOF

BACKGROUND OF THE INVENTION

1. Field of the Invention

The present invention relates to apparatus and method for processing big data and non-transitory tangible machine-readable medium thereof; more particularly, the present invention relates to apparatus and method for realizing big data into big object and non-transitory tangible machine-readable medium thereof.

2. Descriptions of the Related Art

With the rapid development in computer technologies, most enterprises collect, store, manipulate, and organize business information/data in computers in a systematic way. Relational databases and on-line analytical processing (OLAP) are examples of commonly adopted technologies.

Although various commercial products of relational databases and OLAP have been developed, they have shortcomings when the amount of business data being stored becomes huge. There are occasions that a business manager would like to make a real-time decision based on an analytical result of processing a huge amount of data stored in a database. However, databases on the market today cannot provide a real-time response when the amount of data being processed is huge. Accessing and analyzing millions or billions records usually take significant amount of time. For business managers that have to perform analysis and make real-time decisions based on big data, the long-processing time of the databases on the market today is intolerable.

According to the above description, an apparatus and method that can process big/huge/large data efficiently is in an urgent need.

SUMMARY OF THE INVENTION

The primary objective of the present invention is to provide an apparatus for realizing big data into a Big Object. The apparatus comprises an interface and a processor. The interface is configured to access big data stored in a storage device. The processor is configured to create the Big Object from the big data using memory mapped files. The processor is further configured to lay out a content of the Big Object, wherein the content comprising a meta information section, a tree section, and a data section. The processor is further configured to lay out a content of the tree section by using LIS. In addition, the processor is further configured to describe a structure of the Big Object in the meta information section.

Another objective of the present invention is to provide a method for realizing big data into a Big Object in a computer system. The method comprises the following steps of: (a) creating the Big Object from the big data using memory mapped files, (b) laying out a content of the Big Object, the content comprising a meta information section, a tree section, and a data section, (c) laying out a content of the tree section by using Location-Independent Structure (LIS), and (d) describing a structure of the Big Object in the meta information section.

Yet a further objective of the present invention is to provide a non-transitory tangible machine-readable medium. The non-transitory tangible machine-readable medium is stored with a computer program comprising a plurality of codes. The codes are able to execute a method for realizing big data into a Big Object when the computer program is loaded into an electronic apparatus. The codes comprise code A, code B, code C, and code D. Code A is for creating the Big Object from the big data using memory mapped files. Code B is for laying out a content of the Big Object, wherein the content comprising a meta information section, a tree section, and a data section. Code C is for laying out a content of the tree section by using LIS. Code D is for describing a structure of the Big Object in the meta information section.

The present invention realizes big data into a Big Object by the technologies of memory mapped files and LIS, so measures of the Big Object are arranged in a continuous memory space. In this way, no matter what kind of operation is applied to the Big Object, measures of the Big Object can be accessed efficiently when various operation are applied.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, apparatus and method for processing big data and non-transitory tangible machine-readable medium thereof of the present invention will be explained with reference to embodiments thereof. However, these embodiments are not intended to limit the present invention to any specific environment, applications, or particular implementations described in these embodiments. Therefore, description of these embodiments is only for purpose of illustration rather than to limit the present invention. It should be appreciated that elements unrelated to the present invention are omitted from depiction in the following embodiments and the attached drawings.

Figure 1A:
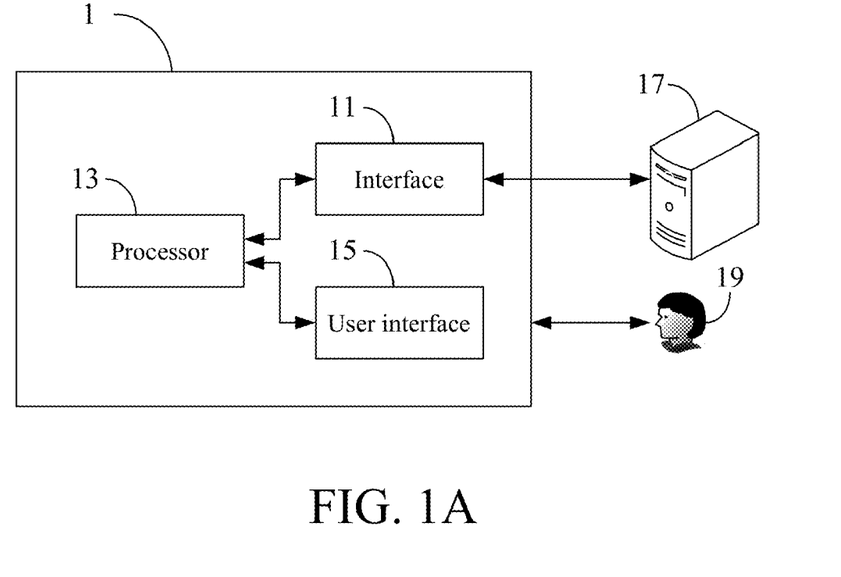
FIG. 1A illustrates a first embodiment of the present invention.

A first embodiment of the present invention is illustrated in FIG. 1A, which is an apparatus 1 for realizing big data into a Big Object. The apparatus 1 comprises an interface 11, a processor 13, and a user interface 15, wherein the processor 13 is electrically connected to the interface 11 and the user interface 15. The interface 11 may be any interface that can be connected to a storage device. The processor 13 may be any of various processors, central processing units (CPUs), microprocessors, or other computing devices well known to those of ordinary skill in the art. The user interface 15 may be any interface that can be controlled by a user and generate an instruction according to the control of the user.

A storage device 17 comprises big data. The big data is stored as a multi-dimensional data model that comprises a plurality of dimensions. The multi-dimensional data model comprises numeric facts called measures, wherein each measure is a data element organized and accessible through the multi-dimensional space of the cross-product of all dimensions. Each dimension is a single space comprising a plurality of members with a common set of attributes; that is, the members in a dimension can be described by a set of attributes.

The creation of a Big Object begins when a user 19 inputs an address that links to the big data in the storage device 17 via the user interface 15. After the connection between the interface 11 and the storage device 17 has been established, the interface 11 can access the big data, including dimensions, attributes, and measures of the big object. The processor 13 then creates a Big Object from the big data using memory mapped files. When the operating system run on the apparatus 1 is Linux, the technology of memory mapped files can be realized by the function mmap( ) On the other hand, when the operation system run on the apparatus 1 is Windows, the technology of memory mapped files can be realized by the function MapViewOfFile( ) and the function of CreateFileMapping( ) It is noted that people skilled in the art should be familiar with the technology of memory mapped files.

Figure 1B:
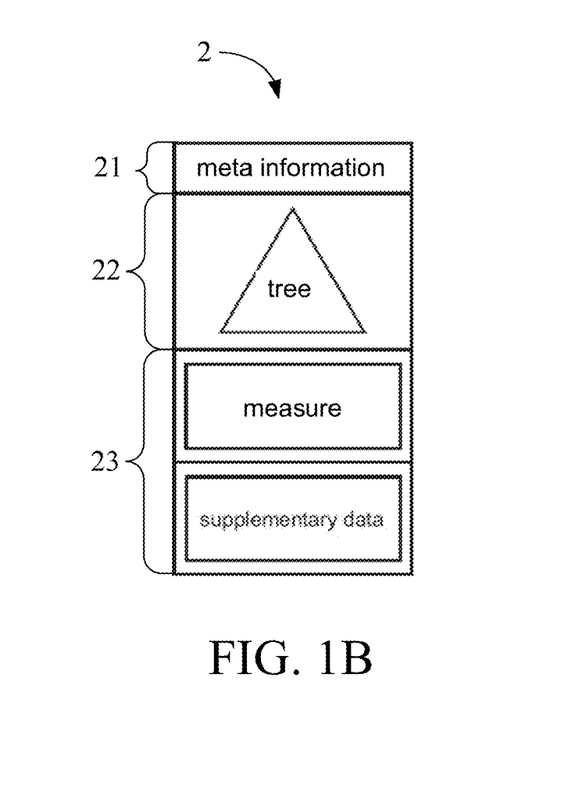
FIG. 1B illustrates a content of the Big Object.

The processor 13 lays out a content 2 of the Big Object. As shown in FIG. 1B, the content 2 comprises a meta information section 21, a tree section 22, and a data section 23. Specifically, the processor 13 lays out a content of the tree section by using Location-Independent Structure (LIS). The tree section comprises a recursive LIS data structure of a tree, the recursive LIS data structure is arranged in a continuous memory space in the following way:

$$LIS(r)=[s1,s2,\ldots,sn,LIS(s1),LIS(s2),\ldots,LIS(sn)],$$

wherein the function LIS( ) represents LIS, the variable r represents a root node of the tree, the variables s1, s2, . . . , and sn represent child nodes of the root node. Each node of the tree includes a child pointer field for a child pointer, a field for the number of children, and a data pointer field for a data pointer. Each child pointer is an offset relative to the current LIS and each data pointer is an offset relative to the data section.

Figure 1C:
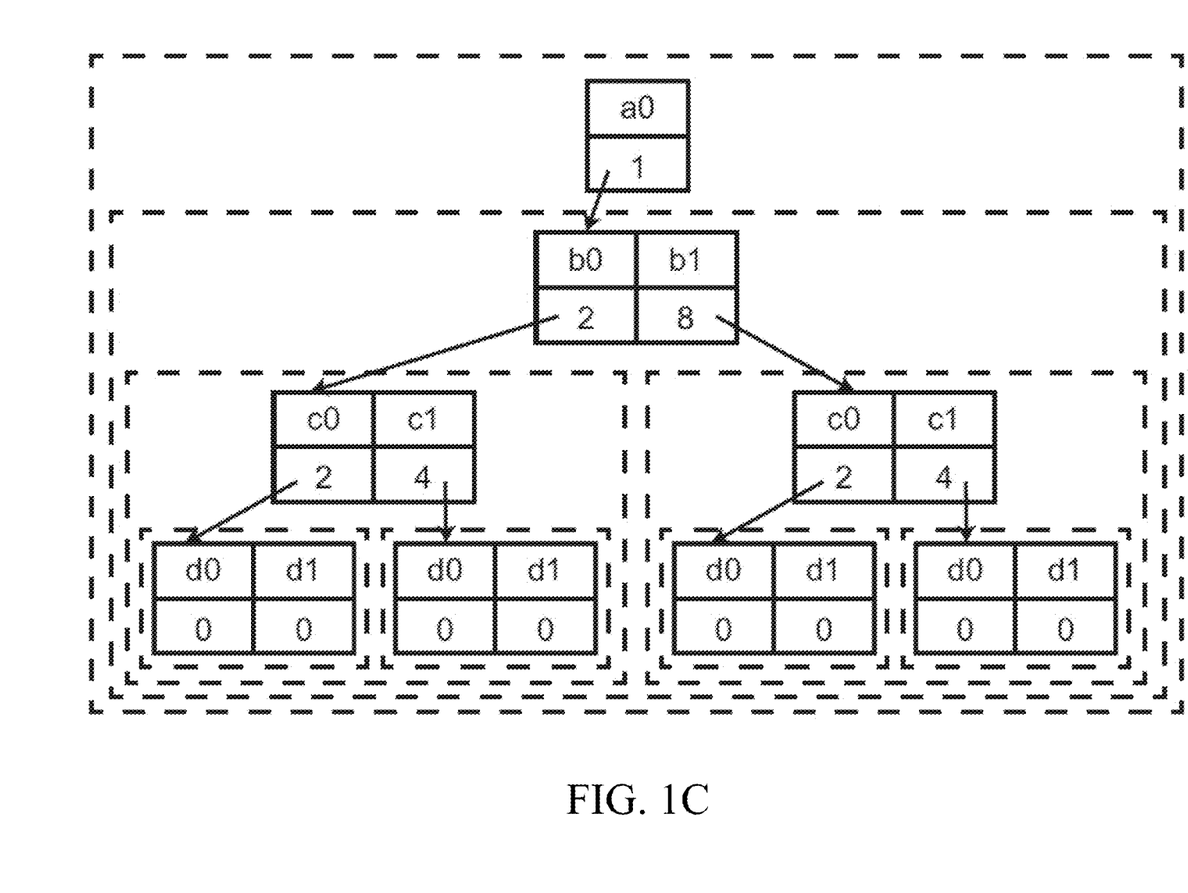
FIG. 1C illustrates an example of a tree that is laid out based on LIS.
Figure 1D:
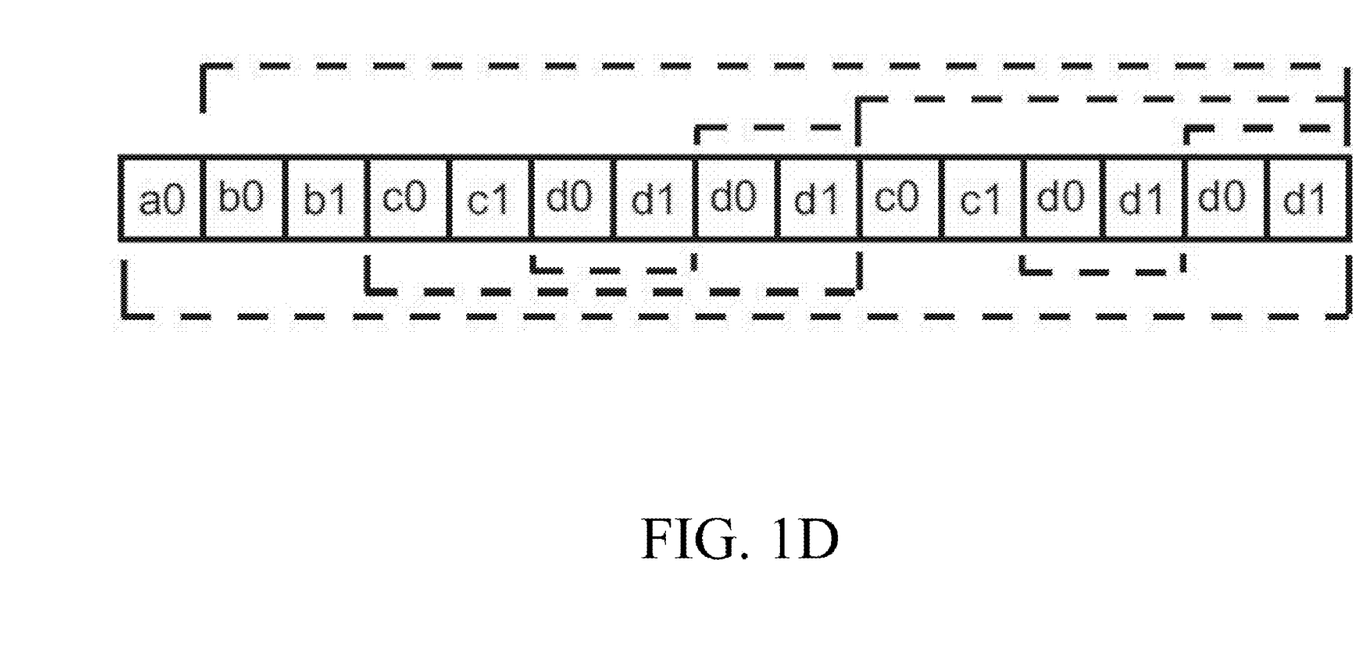
FIG. 1D illustrates how the sub-tree shown in FIG. 1C is organized in an array.

The tree in the tree section is organized based on two principles: (a) depth first order and (b) children are grouped together in a consecutive array. An example of a tree that is laid out based on LIS is given in FIG. 1C. In order to find a child node and descendants of a node of the tree/sub-tree, each node in the sub-tree has a child pointer field which is used to find its children. The child pointer field holds the offset of children relative to the enclosing LIS. Since all children are arranged in a consecutive array, the child pointer field actually points to its leftmost child. The actual address of a child node in memory can be calculated by adding the LIS base address and the child field offset. A concrete example for calculating the actual address of a child node is given herein. It is assumed that the base address of the LIS for the tree rooting at a0 (i.e. the one shown in FIG. 1C) is 0xFFFF0000, the size of each node is 16 bytes, and the child field offset of the leftmost child b0 is 0X00000010. With the information, the actual address of the leftmost child b0 is 0xFFFF0010 (0xFFFF0000+0X00000010). In addition, the base address of the LIS which includes a0's descents is 0xFFFF0010. FIG. 1D shows how the sub-tree shown in FIG. 1C is organized in an array. It can be easily seen that each LIS is placed in a consecutive location.

There are several benefits for arranging the nodes of a tree/sub-tree based on LIS. The first benefit is to preserve sibling locality because it is very common to retrieve sibling data at the same time. In addition, information of the tree is location independent in the memory, meaning that each LIS is stored in consecutive locations and can be moved easily, which is the essential operation for splitting a sub-tree.

As to the data section 23, it may comprise measures (including general measures and/or time series measures) and supplementary data. In the big object, all measures are grouped together in the same section. The measures can be Boolean, integer, long integer, float, double, complex data structure, pointers, or a piece of executable codes. The supplementary data section contains supporting information for operations of Big Objects. For example, it may include the mapping table between a node id and its value when the mapping is local. Smart pointers and customized data may be included in the data section 23 as well. The details of the smart pointers will be described later.

Regarding the meta information section 21, the processor 13 describes a structure of the Big Object therein. The meta information section may also comprise a piece of data model description, a piece of tree hierarchy and structure description, a piece of data element description, and a time stamp and revision number.

Figure 1E:
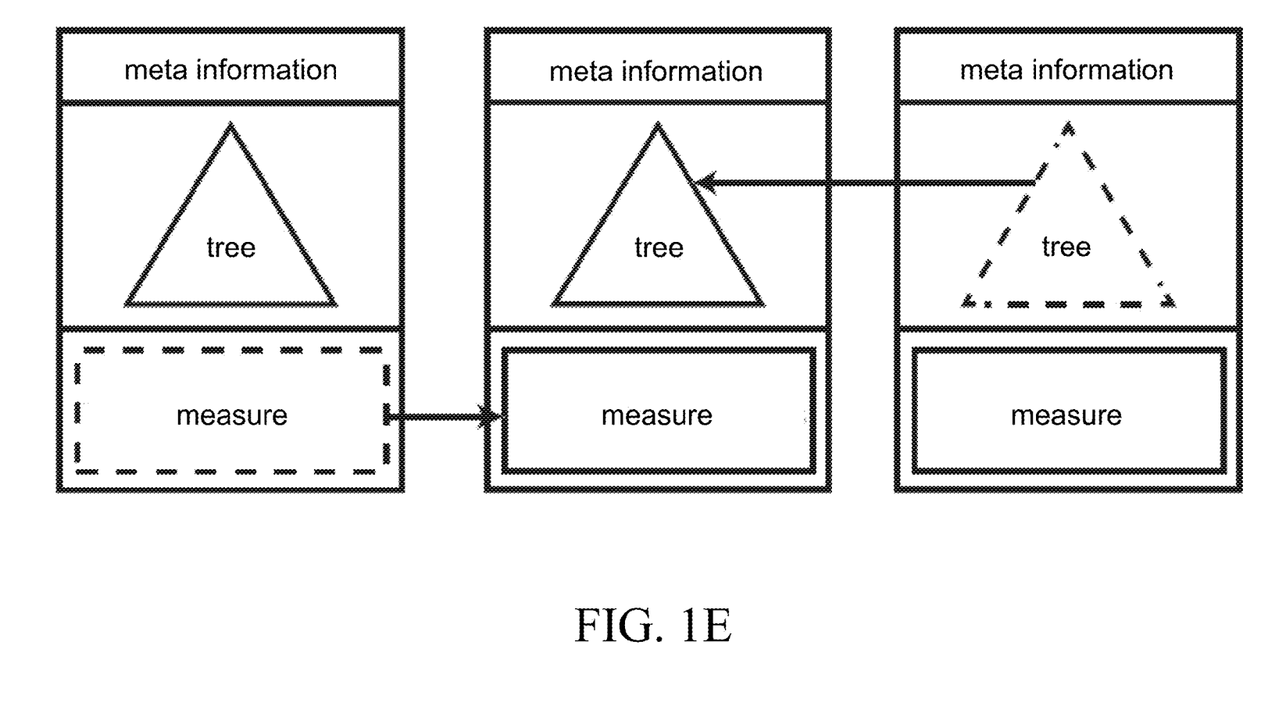
FIG. 1E illustrates a Big Object having a smart pointer.

In a preferred embodiment, the Big Object created by the processor 13 may have at least one smart pointer referring to at least one external Big Object. With the at least one smart pointer, the Big Object and the external Big Object can share information. The shared information may be information in the meta information section, the tree section, and/or the data section.

The smart pointer may comprise a pointer field and a URL referring the external Big Object. When the smart pointer is in the meta information section and the URL refers to the meta information section of the external Big Object, the Big Object uses the meta information in the external Big Object. When the smart pointer is in the tree section and the URL refers to a sub-tree of the external Big Object, the Big Object shares the sub-tree contained in the tree section of the external Big Object as shown in FIG. 1E. When the smart pointer is in the data section and the URL refers to the data section of the external Big Object, the Big Object shares the information in the data section of the external Big Object as shown in FIG. 1E. It is noted that the tree shown in the dotted triangle and the measure shown in dotted rectangle in FIG. 1E are the ones that have smart pointers.

Furthermore, when the Big Object comprises a smart pointer, the processor 13 opens the external Big Object specified by the URL using memory mapped files, updates the pointer field of the smart pointer with a memory address of the external Big Object, and accesses the external Big Object via the pointer field. Since the memory address of the external Big Object is updated in the pointer field of the smart pointer, the processor 13 can efficiently access the shared information of the external Big Object later on.

After the meta information section 21, the tree section 22, and the data section 23 have be laid out successfully, the Big Object can be accessed and processed via various operations efficiently. Each of them will be elaborated in the following paragraphs.

There are occasions that the user 19 has to enter a path condition via the user interface 15. For example, Select operations, Split operations, and Join operations have to be performed based on at least one path condition. When the processor 13 receives a path condition described by XPath, the processor 13 traverses the tree of the Big Object by starting from a root of the recursive LIS data structure of the tree in the tree section, determines that at least one sibling node satisfies the path condition, and traverses next LISs corresponding to the at least one sibling node recursively.

There are occasions that a path condition of a given node has to be found. For those occasions, the processor 13 receives a memory address of a given node. Thereafter, the processor 13 traverses the tree of the Big Object by starting from a root of the recursive LIS data structure of the tree in the tree section, determines a sub-LIS whose memory rage contains the memory address of the given node, determines a current node corresponding to the sub-LIS, and appends a name of the current node to a path name described by XPath and traverse the sub-LIS until the given node is found.

There are occasions that the user 19 would like to view the Big Object from different angles, in which a Transform operation is required. In those situations, the user 19 inputs a command for requesting a transform operation on the Big Object. Then, the processor 13 generates another Big Object by applying the transform operation on the Big Object. Specifically, the processor 13 performs the transform operation by traversing a tree structure of the Big Object by starting from a root of the recursive LIS data structure in the tree section, enumerating every Xpath of the tree structure, and creating the another Big Object with new hierarchies based on every enumerated XPath.

Figure 1F:
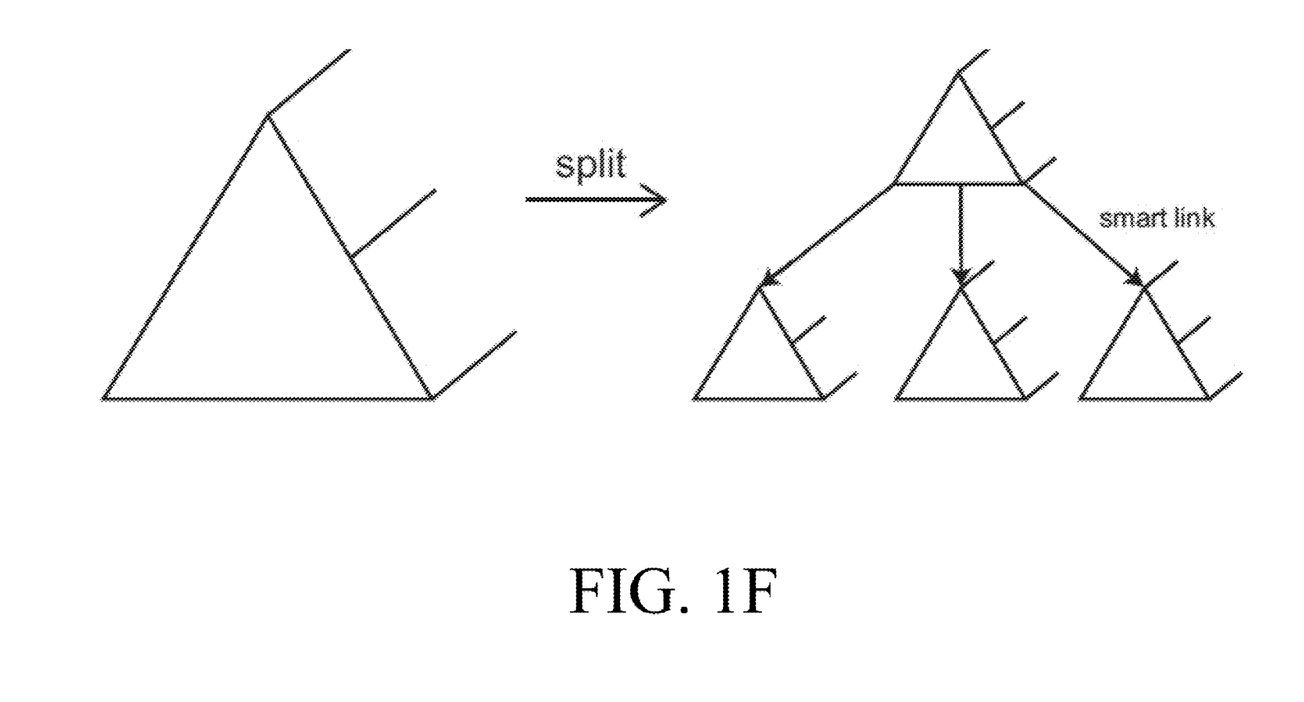
FIG. 1F illustrates the concept of the split operation.

There are occasions that the user 19 would like to have the Big Object split. For example, the Big Object may be distributed into different servers and processed in parallel. In order to split the Big Object, the user 19 inputs a command for requesting a split operation on the Big Object so that the processor 13 performs the split operation on the Big Object. Specifically, the processor 13 performs the split operation by receiving a path condition described by XPath, locating a root node of at least one sub-tree that meets the path condition, creating a split Big Object for each of the at least one sub-tree, and updating the root node of each of the at least one sub-tree with a smart pointer containing a URL of the split Big Object. FIG. 1F illustrates the concept of the split operation.

There are occasions that the user 19 would like to have the Big Object joined, such as joining the split Big Object. In that case, the user 19 may input a command for requesting a join operation on the Big Object and the processor 13 performs the join operation between the Big Object and each of the at least one split Big Object. Specifically, the processor 13 performs the join operation by traversing a tree structure of the Big Object by starting from a root of the recursive LIS data structure in the tree section, traversing each of the at least one split Big Object referred by the smart pointers in the tree section, enumerating every XPath of the tree structure, and creating another Big Object based on every enumerated Xpath.

According to the above description, it is understood that the apparatus 1 of the present invention realizes big data into a Big Object by the technologies of memory mapped files and LIS. In this way, various operations can be performed on the Big Object in an efficient manner.

Figure 2:
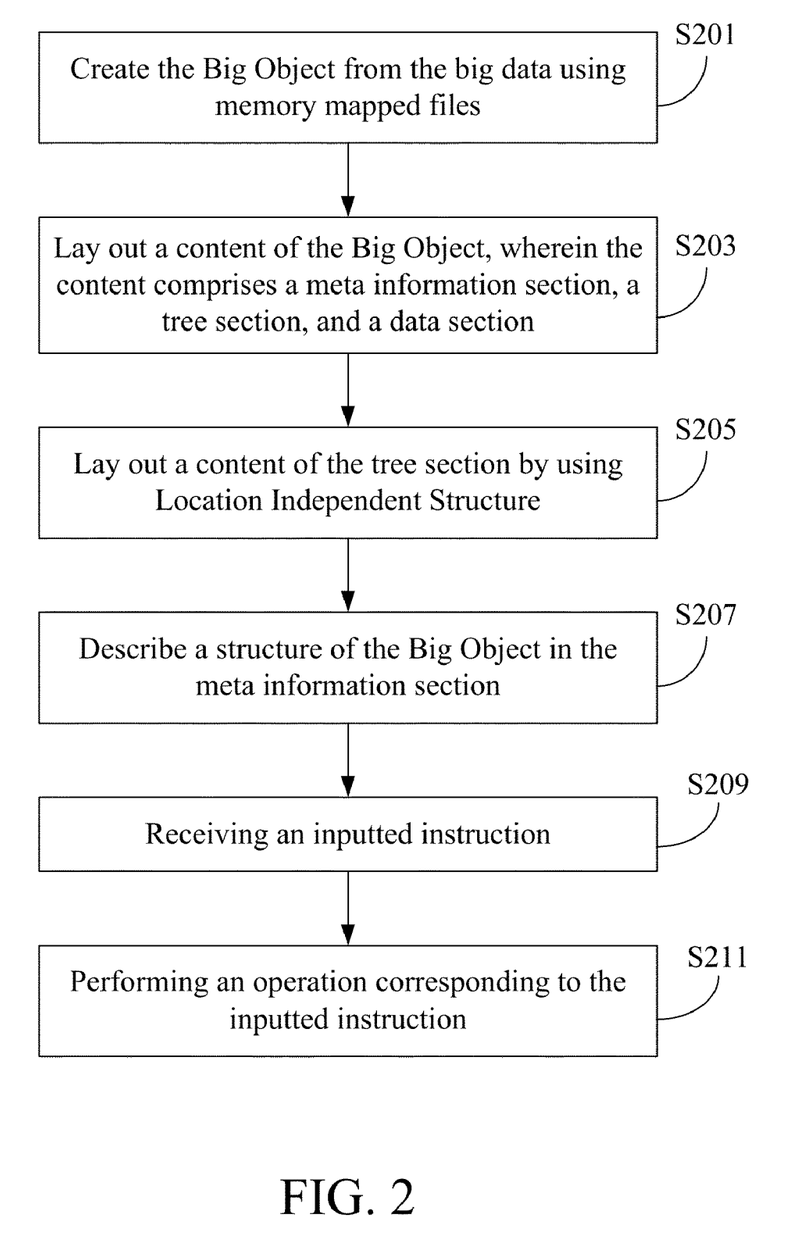
FIG. 2 illustrates the flowchart of a second embodiment of the present invention.

A second embodiment of the present invention is a method for realizing big data into a Big Object in a computer system, such as the large-scale data processing system 1 in the first embodiment. A flowchart of the second embodiment is illustrated in FIG. 2.

First, method execute step S201 to enable the computer system to create the Big Object from the big data using memory mapped files. Then, the method executes step S203 to enable the computer system to lay out a content of the Big Object, wherein the content comprises a meta information section, a tree section, and a data section.

Following that, the method executes step S205 to enable the computer system to lay out a content of the tree section by using LIS. In a preferred embodiment, the tree section comprises a recursive LIS data structure of a tree and the recursive LIS data structure is arranged in a continuous memory space in the following way:

$$LIS(r)=[s1,s2,\ldots,sn,LIS(s1),LIS(s2),\ldots,LIS(sn)],$$

wherein the function LIS( ) represents LIS, the variable r represents a root node of the tree, the variables $s1, s2, \ldots$, and $sn$ represent child nodes of the root node. Each node of the tree includes a child pointer field, a field for the number of children, and a data pointer field. Each child pointer is an offset relative to the current LIS, and each data pointer is an offset relative to the data section.

The method also executes step S207 to enable the computer system to describe a structure of the Big Object in the meta information section. In step S207, the method may further describe a piece of data model description, a piece of tree hierarchy and structure description, a piece of data element description, and a time stamp and revision number in the meta information section.

It is noted that the Big Object created by steps S201, S203, S205, and S207 may comprise a smart pointer referring to an external Big Object. The smart pointer comprises a pointer field and an URL referring the external Big Object. When the smart pointer is in the meta information section and the URL refers to a meta information section of the external Big Object, the Big Object and the external Big Object share the meta information. On the other hand, when the smart pointer is in the tree section and the URL refers to a tree/sub-tree of the external Big Object, the tree/sub-tree of the external Big Object is shared. When there is a smart pointer in the Big Object, the method opens the external Big Object specified by the URL using memory mapped files, updates the pointer field of the smart pointer with a memory address of the external Big Object, and accesses the external Big Object via the pointer field.

After the method laid out the meta information section 21, the tree section 22, and the data section 23 of the Big Object successfully, the Big Object can be accessed and processed via various operations efficiently. The method may execute step S209 to receive an inputted instruction and then execute step S211 to perform an operation corresponding to the inputted instruction accordingly.

If the inputted instruction received in step S209 is a path condition described by XPath along with an instruction requiring that path condition, step S211 traverses a tree structure of the Big Object by starting from a root of the recursive LIS data structure of the tree in the tree section, determines at least one sibling node that satisfies the path condition, and traverses next LISs corresponding to the at least one sibling node recursively.

When the inputted instruction received in step S209 is a memory address of a given node and an instruction of requiring the memory address, step S211 traverses a tree structure of the Big Object by starting from a root of the recursive LIS data structure in the tree section, determines a sub-LIS whose memory rage contains the memory address of the given node, determines a current node corresponding to the sub-LIS, appends a name of the current node to a path name described by XPath, and traverses the sub-LIS until the given node is found.

If the inputted instruction received in step S209 is an instruction for performing a transform operation, step S211 generates another Big Object by applying a transform operation on the Big Object. Specifically, step S211 enables the computer system traverses a tree structure of the Big Object by starting from a root of the recursive LIS data structure in the tree section, enumerates every Xpath of the tree structure, and creates the another Big Object with new hierarchies based on every enumerated XPath.

If the inputted instruction received in step S209 is an instruction for performing a split operation, step S211 performs a split operation on the Big Object by receiving a path condition described by XPath, locating a root node of at least one sub-tree that meets the path condition, creating a split Big Object for each of the at least one sub-tree, and updating the root node of each of the at least one sub-tree with a smart pointer containing an URL of the split Big Object.

If the inputted instruction received in step S209 is an instruction for performing a join operation, step S211 performs a join operation between the Big Object and each of the at least one split Big Object by traversing a tree structure of the Big Object by starting from a root of the recursive LIS data structure in the tree section, traversing each of the at least one split Big Object referred by the smart pointers in the tree section, enumerating every XPath of the tree structure, and creating another Big Object based on every enumerated Xpath In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

The method for realizing big data into a Big Object in a computer system described in the second embodiment may be implemented as a computer program. When the computer program is loaded into the computer system or the apparatus 1, a plurality of codes comprised in the computer program are able to perform the method for realizing big data into a Big Object described in the second embodiment. This computer program may be stored in a tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

According to the above description, it is understood that the present invention realizes big data into a Big Object by the technologies of memory mapped files and LIS, so measures of the Big Object are arranged in a continuous memory space. In this way, no matter what kind of operation is applied to the Big Object, measures of the Big Object can be accessed efficiently when various operation are applied.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for realizing big data into a Big Object, comprising:
    an interface, being configured to access big data stored in a storage device; and
    a processor, being configured to perform the following operations:
        creating the Big Object from the big data using memory mapped files,
        laying out a content of the Big Object, the content comprising a meta information section, a tree section, and a data section,
        laying out a content of the tree section by using Location Independent Structure (LIS), and
        describing a structure of the Big Object in the meta information section;
    wherein the tree section comprises a recursive LIS data structure of a tree, the recursive LIS data structure is arranged in a continuous memory space in the following way:

$$LIS(r)=[s1,s2,\ldots,sn,LIS(s1),LIS(s2),\ldots,LIS(sn)],$$

wherein the function LIS0 represents LIS, the variable r represents a root node of the tree, the variables s1, s2, . . . , to sn represent child nodes of the root node, each node includes a child pointer field, a field for the number of children, and a data pointer field, each child pointer is an offset relative to the current LIS, and each data pointer is an offset relative to the data section.

2. The apparatus of claim 1, wherein the meta information section comprises a piece of data model description, a piece of tree hierarchy and structure description, a piece of data element description, and a time stamp and revision number.

3. The apparatus of claim 1, wherein the Big Object comprise a smart pointer referring to an external Big Object.

4. The apparatus of claim 3, wherein the smart pointer comprises a pointer field and a URL referring the external Big Object.

5. The apparatus of claim 4, wherein the smart pointer is in the meta information section and the URL refers to a meta information section of the external Big Object.

6. The apparatus of claim 4, wherein the smart pointer is in the tree section and the URL refers to a sub-tree of the external Big Object.

7. The apparatus of claim 4, wherein the processor is further configured to open the external Big Object specified by the URL using memory mapped files, update the pointer field of the smart pointer with a memory address of the external Big Object, and access the external Big Object via the pointer field.

8. The apparatus of claim 1, wherein the processor is further configured to receive a path condition described by XPath, traverse a tree structure of the Big Object by starting from a root of the recursive LIS data structure in the tree section, determine that at least one sibling node satisfies the path condition, and traverse next LISs corresponding to the at least one sibling node recursively.

9. The apparatus of claim 1, wherein the processor is further configured to receive a memory address of a given node, traverse a tree structure of the Big Object by starting from a root of the recursive LIS data structure in the tree section, determines a sub-LIS whose memory rage contains the memory address of the given node, determines a current node corresponding to the sub-LIS, appends a name of the current node to a path name described by XPath and traverse the sub-LIS until the given node is found.

10. The apparatus of claim 1, wherein the processor is further configured to generate another Big Object by applying a transform operation on the Big Object, the transform operation comprises the following operations:
    traversing a tree structure of the Big Object by starting from a root of the recursive LIS data structure in the tree section,
    enumerating every Xpath of the tree structure, and
    creating the another Big Object with new hierarchies based on every enumerated XPath.

11. The apparatus of claim 1, wherein the processor is further configured to perform a split operation on the Big Object, the split operation comprises the following operations:

receiving a path condition described by XPath, locating a root node of at least one sub-tree that meets the path condition, creating a split Big Object for each of the at least one sub-tree, and updating the root node of each of the at least one sub-tree with a smart pointer containing a URL of the split Big Object.

12. The apparatus of claim 11, wherein the processor is further configured to perform a join operation between the Big Object and each of the at least one split Big Object, the join operation comprises the following operations:

traversing a tree structure of the Big Object by starting from a root of the recursive LIS data structure in the tree section, traversing each of the at least one split Big Object referred by the smart pointers in the tree section enumerating every XPath of the tree structure, and creating another Big Object based on every enumerated Xpath.

13. A method for realizing big data into a Big Object in a computer system, comprising the following steps of:

creating the Big Object from the big data using memory mapped files;

laying out a content of the Big Object, the content comprising a meta information section, a tree section, and a data section;

laying out a content of the tree section by using LIS; and describing a structure of the Big Object in the meta information section;

wherein the tree section comprises a recursive LIS data structure of a tree, the recursive LIS data structure is arranged in a continuous memory space in the following way:

$$LIS(r)=[s1,s2,\ldots,sn,LIS(s1),LIS(s2),\ldots,LIS(sn)],$$

wherein the function LIS( ) represents LIS, the variable r represents a root node of the tree, the variables s1, s2, . . . , to sn represent child nodes of the root node, each node includes a child pointer field, a field for the number of children, and a data pointer field, each child pointer is an offset relative to the current LIS, and each data pointer is an offset relative to the data section.

14. The method of claim 13, wherein the meta information section comprises a piece of data model description, a piece of tree hierarchy and structure description, a piece of data element description, and a time stamp and revision number.

15. The method of claim 13, wherein the Big Object comprise a smart pointer referring to an external Big Object.

16. The method of claim 15, wherein the smart pointer comprises a pointer field and a URL referring the external Big Object.

17. The method of claim 16, wherein the smart pointer is in the meta information section and the URL refers to a meta information section of the external Big Object.

18. The method of claim 16, wherein the smart pointer is in the tree section and the URL refers to a sub-tree of the external Big Object.

19. The method of claim 16, further comprising the following steps of:

opening the external Big Object specified by the URL using memory mapped files;

updating the pointer field of the smart pointer with a memory address of the external Big Object; and accessing the external Big Object via the pointer field.

20. The method of claim 13, further comprising the following steps of:

receiving a path condition described by XPath;

traversing a tree structure of the Big Object by starting from a root of the recursive LIS data structure in the tree section;

determining that at least one sibling node satisfies the path condition; and traversing next LISs corresponding to the at least one sibling node recursively.

21. The method of claim 13, further comprising the following steps of:

receiving a memory address of a given node;

traversing a tree structure of the Big Object by starting from a root of the recursive LIS data structure in the tree section;

determining a sub-LIS whose memory rage contains the memory address of the given node;

determining a current node corresponding to the sub-LIS;

appending a name of the current node to a path name described by XPath; and traversing the sub-LIS until the given node is found.

22. The method of claim 13, further comprising the following steps of:

generating another Big Object by applying a transform operation on the Big Object, comprising the following steps of:

traversing a tree structure of the Big Object by starting from a root of the recursive LIS data structure in the tree section;

enumerating every Xpath of the tree structure; and creating the another Big Object with new hierarchies based on every enumerated XPath.

23. The method of claim 13, further comprising the following steps of:

performing a split operation on the Big Object, comprising the following steps of:

receiving a path condition described by XPath;

locating a root node of at least one sub-tree that meets the path condition;

creating a split Big Object for each of the at least one sub-tree; and updating the root node of each of the at least one sub-tree with a smart pointer containing a URL of the split Big Object.

24. The method of claim 23, further comprising the following steps of:

performing a join operation between the Big Object and each of the at least one split Big Object, comprising the following steps of:

traversing a tree structure of the Big Object by starting from a root of the recursive LIS data structure in the tree section;

traversing each of the at least one split Big Object referred by the smart pointers in the tree section;

enumerating every XPath of the tree structure; and creating another Big Object based on every enumerated Xpath.

25. A non-transitory tangible machine-readable medium, being stored with a computer program, the computer program comprising a plurality of codes, the codes being able to execute a method for realizing big data into a Big Object when the computer program is loaded into an electronic apparatus, the codes comprising:

code A for creating the Big Object from the big data using memory mapped files;

code B for laying out a content of the Big Object, the content comprising a meta information section, a tree section, and a data section;

code C for laying out a content of the tree section by using LIS; and code D for describing a structure of the Big Object in the meta information section;

wherein the tree section comprises a recursive LIS data structure of a tree, the recursive LIS data structure is arranged in a continuous memory space in the following way:

$LIS(r)=[s1,s2,\ldots,sn,LIS(s1),LIS(s2),\ldots,LIS(sn)]$, wherein the function LIS( ) represents LIS, the variable r represents a root node of the tree, the variables s1, s2, ..., to sn represent child nodes of the root node, each node includes a child pointer field, a field for the number of children, and a data pointer field, each child pointer is an offset relative to the current LIS, and each data pointer is an offset relative to the data section.

* * * * *